United States Patent [19]

Webber et al.

[11] 3,863,518
[45] Feb. 4, 1975

[54] TRANSMISSION SHIFTING SYSTEM

[75] Inventors: Philip S. Webber; Joseph E. Goett, both of Peoria, Ill.

[73] Assignee: Caterpillar Tractor Co., Peoria, Ill.

[22] Filed: Feb. 1, 1974

[21] Appl. No.: 438,667

[52] U.S. Cl. .................. 74/340, 74/346, 74/364, 192/3.51, 192/3.57
[51] Int. Cl. ...... F16h 3/40, F16h 3/22, F16d 67/00
[58] Field of Search .................. 74/340, 346, 364; 192/3.51, 3.57; 92/20, 21 R, 61, 129; 91/465; 251/89

[56] References Cited
UNITED STATES PATENTS

| | | | |
|---|---|---|---|
| 2,529,393 | 11/1950 | Hogue | 74/364 |
| 2,924,126 | 2/1960 | Isaacson et al. | 74/364 X |
| 3,106,273 | 10/1963 | Doerfer et al. | 74/364 X |
| 3,508,450 | 4/1970 | Richards | 74/340 |
| 3,570,636 | 3/1971 | Franz | 192/3.51 |
| 3,667,309 | 6/1972 | Franz et al. | 74/340 |

*Primary Examiner*—Samuel Scott
*Assistant Examiner*—P. S. Lall
*Attorney, Agent, or Firm*—Phillips, Moore, Weissenberger, Lempio & Strabala

[57] ABSTRACT

A drive transmission for powered vehicles and the like has change speed gears which may be shifted to provide a selected one of a plurality of drive speed ratios by means of a fluid-operated control system. The control system includes a plurality of fluid energized actuating means for operating shift fork transmission elements, one of which includes neutralizing means for automatically and positively disengaging the vehicle drive line in the event of system malfunction and for disengaging the vehicle drive line when neutral is selected. Another of the actuating means includes a safety actuator for preventing simultaneous engagement of reverse and forward gears of the transmission.

10 Claims, 3 Drawing Figures

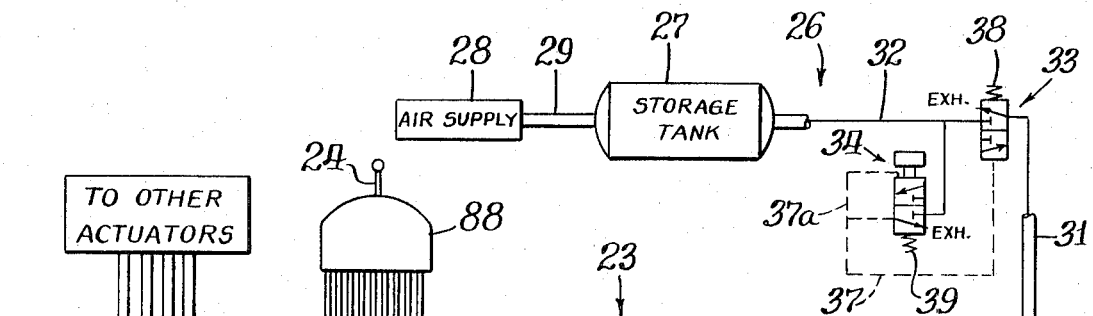
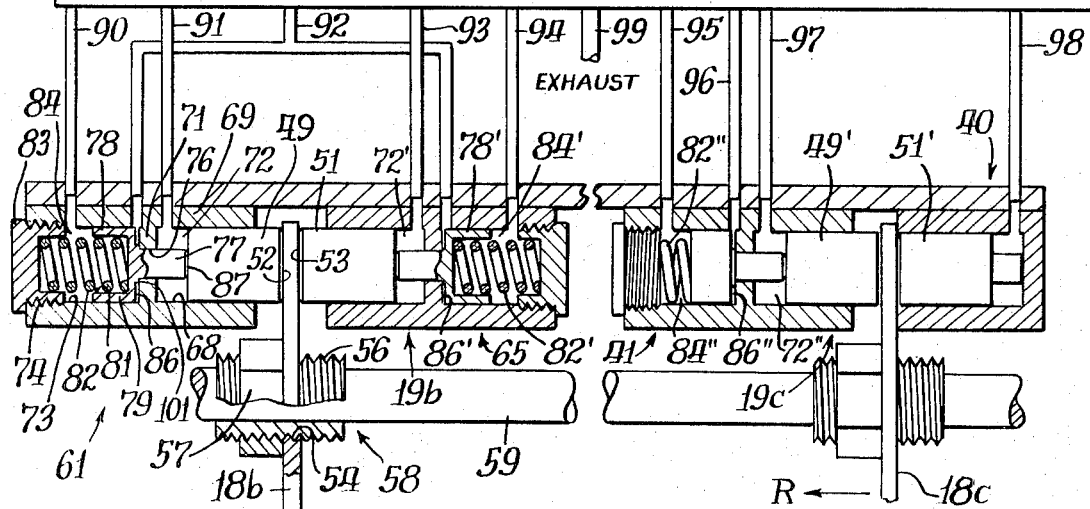
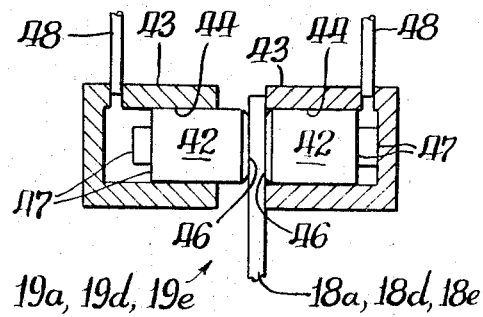

TRANSMISSION SHIFTING SYSTEM

BACKGROUND OF THE INVENTION

This invention relates to mechanical drive transmissions of the type having a plurality of change speed gears with means for shifting interconnections between the gears to provide a selected drive ratio and, more particularly, to a control system for such shifting means including fluid-operated actuating means for permitting positive disconnection of the vehicle drive line and the gears and for preventing simultaneous engagement of forward and reverse drive gears of the transmission.

Hybrid transmissions representing a cross between automatic or semi-automatic systems having hydrodynamic drive elements and planetary gears shifted by fluid powered means, and standard transmissions having a set of ratio gears manually shiftable by associated clutch means have become increasingly popular. Such hybrid-type transmissions embody to a great extent the advantages of each of the parent transmissions; i.e., highly efficient shift performance and relatively simple shift control means of the fluid powered transmission, and the compactness, relative simplicity, and more efficient non-transient torque transmission, of the standard transmission.

Exemplary of such hybrid-type transmissions is that described in U.S. Pat. No. 3,508,450 to Richards, of common assignment herewith. The transmission described in the Richards patent employs a plurality of change speed gears with means for shifting interconnections between the gears to provide a selected drive ratio. Clutches are provided at both the input and output end of the gearing section to enable the change speed gears to be completely isolated and stopped during a shift to effect shifting without requiring bulky synchronizers. Such clutching also makes it practical to utilize every possible power path through the gears for the purpose of obtaining a large number of different drive ratios with a minimum of gears. However, such a system requires actuation of more clutches, brakes and shifting forks than does a conventional standard transmission, and it becomes necessary to provide means for reducing the effort, concentration and skill demanded of the operator for shifting the relatively complex mechanism.

Accordingly, control systems particularly useful for controlling the functions of the above-described hybrid-type transmissions have been proposed, such as the fluid powered control system described in U.S. Pat. No. 3,570,636 to Franz, et al., of common assignment herewith. This control system includes a plurality of cam-operated valves which condition a fluid circuit for operating and sequencing a plurality of fluid powered actuators which effect the selected shift. Additionally, improved means for facilitating shifting of the above-described hybrid-type transmissions have been proposed, such as the braking means for the change speed gears and associated fluid-operated shift means described in U.S. Pat. No. 3,667,309 to Franz, et al., of common assignment herewith, and the shift fork mechanism for manipulating the transmission clutches described in U.S. Pat. No. 3,620,097 to Herr, of common assignment herewith.

It has been found desirable to provide control systems of the type exemplified by the above-mentioned U.S. Pat. Nos. 3,508,450; 3,570,636; and 3,667,309 with means for positively disconnecting the vehicle drive line from a change speed gearing on selection of a neutral gear position by the operator of the vehicle to thereby improve operator control of the vehicle. Preferably such means are associated with transmissions having clutch means which are moved in an axial direction to fully disengage the teeth of adjacently disposed gears or coupling members since such clutch means provide a more positive capability for drive line disconnection than do disc-type clutch means which, when the gears are in neutral, are susceptible to the action of fluid on the stack of interleaved plates and discs which fluid tends to cause a viscous drag between them, and consequently transmit a limited amount of torque to the wheels of the vehicle, causing it to creep.

It is additionally desirable, in terms of improved operator control of the vehicle, that, in the event of a control system malfunction, means be provided for quickly and automatically placing the transmission in neutral condition, with positive disconnection of the vehicle drive line from the change speed gearing. For example, in the event of electrical failure or a loss of fluid pressure in a portion of the control system, automatic disconnection of the vehicle drive line is a necessity for optimum operator control over the vehicle. Such automatic compensation for failures in the control system are particularly important in view of the increasing complexity of transmission controls in use, which require extended reaction time on the part of the operator and which, in the event of emergency, may endanger the operator if manual operation of the controls to compensate for failure is essential. Further, more fluid-powered transmission control systems typically utilize fluid at a predetermined minimum pressure for controlling the transmission elements, and such control systems do not perform adequately or with full reliability when fluid pressure is below such minimum level. It is, therefore, desirable that means be provided for automatically overriding the transmission control system when necessary to place it in a safe mode of operation. Additionally, it is necessary that a failure in the control fluid supply system be brought promptly to the operator's attention, and that, once the problem is corrected, returning the control system to a fully operative mode is relatively simple.

Additional safety features which are advantageously included in transmission control systems are means for preventing simultaneous engagement of the forward and reverse drive gears of the vehicle. Increasingly sophisticated transmission control systems, particularly those incorporating a large number of electronically or pneumatically operated components, present the possibility of a component failure which would result in power misdirection to engage both forward and reverse drive gears of the vehicle simultaneously. The ensuing attempt to drive a shaft or other drive element in opposite directions at the same time would of course be disastrous.

Prior art means for preventing simultaneous engagement of the forward and reverse gears of a transmission, as well as means for overriding a transmission control system at predetermined fluid pressure levels have been proposed. For example, the above-mentioned U.S. Pat. No. 3,677,309 to Franz et al. describes means for preventing simultaneous engagement of forward and reverse gears somewhat similar to the means of the present invention. Also, U.S. Pat. No. 2,529,393 to Hogue describes means for compensating for insufficient fluid pressure in a fluid operated transmission control system. However, such means are not entirely suitable for use in conjunction with the above-described hybrid-type transmissions.

SUMMARY AND OBJECTS OF THE INVENTION

This invention provides a transmission control system for multiple ratio gear sections which includes neutralizing actuator means for positively disconnecting the transmission gear section from the engine drive line when a neutral mode is selected or when fluid pressure to the control system drops below a predetermined level. The control system further includes reverse actuator means having a safety actuator for preventing simultaneous engagement of the forward and reverse gears in the gear section.

It is an object of the invention to provide a control system for a transmission including means for automatic disconnection of the vehicle drive line in the event of a malfunction in the system.

It is another object of this invention to provide a transmission control system including means for disconnection of the vehicle drive line when the transmission is placed in neutral.

It is a further object of this invention to provide a transmission control system including means for preventing simultaneous engagement of a forward and reverse gear in transmission.

Other objects and advantages of the invention will become apparent from the following description and drawings.

BRIEF DESCRIPTION OF THE DRAWINGS

FIG. 2 is an enlarged partially schematic view of a portion of the system of FIG. 1; and FIG. 3 is an enlarged view of one of the shifting actuators of the present invention.

DETAILED DESCRIPTION

Figure 1:
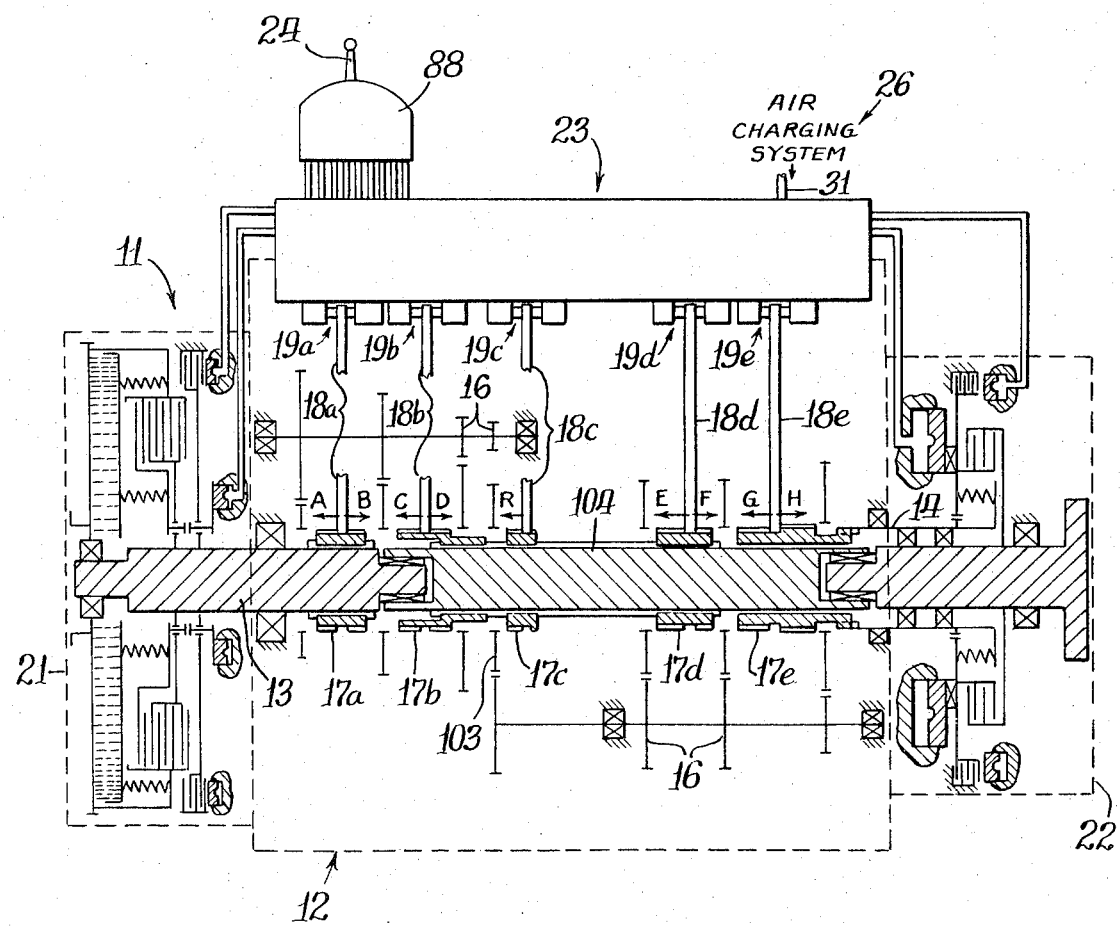
FIG. 1 is a schematic representation of a transmission having a control system embodying the principles of the present invention.

With particular reference to FIG. 1 of the drawings, a transmission 11 in accordance with the present invention includes a change speed gear section 12 of the type described in U.S. Pat. No. 3,667,309. The gear section 12 includes an input shaft 13 extending from the forward end and an output shaft 14 extending from the rearward end, and further includes a plurality of change speed ratio gears 16 which may be interconnected in different patterns by shifting a series of clutch collars 17 to provide any of a predetermined plurality of drive ratios between the input and output shafts. In the particular gearing section illustrated in FIG. 1, 16 forward speeds, neutral, and two reverse speeds may be realized by shifting appropriate combinations of five clutch collars 17a to 17e, in accordance with the suitable mechanical structure detailed in the above-noted patent. Each of the clutch collars 17a to 17e is manipulated by an associated shift fork 18a to 18e respectively, each of which is in turn operated by an associated fluid-operated actuator means 19a to 19e, respectively.

The fluid-operated actuator means 19a to 19e, which will be hereinafter described in detail, are each pressurized to shift the associated shift fork and clutch collar in one of two opposite axial directions as indicated in FIG. 1 to realize the 16 forward speeds, neutral, and two reverse speeds provided in the specific gear section 12.

Although the invention is applicable to transmissions having different arrangements of change speed gears 16, and different numbers of actuator means 19 for providing different numbers of speed ranges, in the illustrated embodiment the actuator means 19, the shift forks 18, and the clutch collars 17 serve to axially interconnect various elements of the gear section 12 by engagement of couplings identified by the letters A through H and R as set forth in the following transmission shift chart:

| Gear | Couplings Engaged |
|---|---|
| 1 | A - D - E - H |
| 2 | A - D - F - H |
| 3 | B - D - E - H |
| 4 | B - D - F - H |
| 5 | A - C - E - H |
| 6 | A - C - F - H |
| 7 | B - C - E - H |
| 8 | B - C - F - H |
| 9 | A - D - E - G |
| 10 | A - D - F - G |
| 11 | B - D - E - G |
| 12 | B - D - F - G |
| 13 | A - C - E - G |
| 14 | A - C - F - G |
| 15 | B - C - E - G |
| 16 | B - C - F - G |
| Rev. 1 | A - R - E - H |
| Rev. 2 | B - R - E - H |
| Neutral | C - D Centered |

It should be noted that, while the transmission 11 of FIG. 1 schematically illustrates the clutch collars 17a, 17d, and 17e at an interim point in their respective axial positions, this represents a transitory central placement of the respective actuating means 19a, 19d, and 19e, since these are two-position only actuating means, and cannot be stopped in the centered position shown.

A change of drive ratio in the gearing section 12 requires that one or more of the tooth clutch collars 17 be disengaged from a toothed ratio gear 16, and that one or more of the clutch collars 17 be engaged with others of the ratio gears 16, according to the above shift chart. This is accomplished without the necessity of bulky conventional synchronizer means by decoupling the input shaft 13 and the output shaft 14 from the engine and driven load, respectively, at the beginning of the shift transient and braking the gears to a stop, or near-stationary condition, before they are shifted. Following operation of the shift actuating means 19, the input shaft 13 and output shaft 14 are recoupled to the driving engine and load, respectively, to reestablish drive through the transmission. An input coupler section 21 performs the decoupling, braking, and recoupling functions at the input shaft 13, while an output coupler section 22 performs similar functions at the output shaft 14. The coupling sections utilized may conveniently be similar to those described in U.S. Pat. No. 3,667,309.

The transmission 11 further includes a shift control circuit 23 for sequencing operation of the several clutches, brakes, and shift actuating means described above according to selected movement of an operator shift lever 24. The control circuit 23 may be similar to the type described in U.S. Pat. No. 3,667,309 to Franz, et al. which circuit includes fluid-directing means for directing control fluid to the appropriate pressure-responsive elements of the transmission 11 to effect the desired gear interconnections and control the functions of the input and output coupler sections 21 and 22.

The shift control circuit 23 of the illustrated embodiment includes a pneumatic control circuit employing air as the control medium and includes an air-charging system 26 which insures that either a minimum operating pressure is supplied to the control circuit 23, or that alternatively, the air source will be entirely disconnected in the event such minimum pressure, for example 60 psi, cannot be supplied.

The air-charging system 26, as best shown in FIG. 2, includes an air storage tank 27 which is in communication with an air supply source 28 via a conduit 29, and is also in communication with an inlet conduit 31 to the control circuit 23 via a conduit 32. Valve means comprising a spring biased pilot operated valve 33 are disposed in the conduit 32 for controlling air flow between the storage tank 27 and the inlet conduit 31. A manually actuable pilot valve means 34 is also included for controlling the operation of the valve 33. The pilot valve means 34 communicate with the conduit 32 via a branch conduit 36 and also communicate with the valve 33 via a pilot signal line 37. The valve 33 is normally closed, and in order to communicate air to the control circuit 23 from the supply source 28 it is necessary to actuate the pilot valve means 34 by manually shifting it downward from the position shown in FIG. 2. This communicates conduits 32 and 36 with the pilot signal line 37, and resultant air pressure in the line 37 operates against the bias of spring 38 and opens the valve 33, shifting it upwardly from the position shown in FIG. 2. If pressure in the conduit 32 is above the predetermined minimum operating pressure, the pilot valve means 34 will remain set in the downward position against the bias of a spring 39 due to air pressure in an upper portion of the valve means via a conduit 37a. If air pressure in the conduit 32 is below the predetermined minimum pressure in the upper portion of the pilot valve or it drops sufficiently to allow a spring 39 to close the pilot valve means and communicate the signal line 37 with exhaust, as illustrated in FIG. 2, the resultant drop in pressure in the line 37 allows the spring 38 to close the valve 33 by shifting it to the position shown in FIG. 2, and to thereby communicate the inlet conduit 31 with an exhaust connection. The pilot valve means 34 can also be manually released after it is set, and can further be associated with an indicating system (not shown) which would alert the operator in the event system pressure is below normal operating level.

As shown in FIG. 2, the actuating means of the transmission 11 include a spring-biased, fluid operated neutralizing actuator 19b for moving the shift fork 18b to positively decouple a clutch of the transmission and disconnect the gear section 12 from the engine drive line when the neutral mode is selected, or in the event control fluid pressure to the actuator 19b drops below a predetermined level. The actuating means further include reverse actuator 19c for shifting the transmission 11 into reverse, which actuator includes a reverse actuator portion 40 and a safety actuator portion 41 for preventing simultaneous engagement of forward and reverse gears of the gear section 12.

The actuating means 19a, 19d, and 19e are of a known type such as that described, in the above-identified U.S. Pat. No. 3,620,097 to Herr. Such actuator means 19a, 19d, and 19e are best shown in FIG. 3 to include a pair of opposed plungers 42 individually disposed within a stationary housing 43 within a cylindrical blind bore 44. Each of the plungers 42 has an outer extremity 46 disposed for facing engagement with the respective shift fork 18a, 18d, or 18e, and an inner extremity 47 within the bore 44 responsive to a fluid signal from the control circuit 23 via a signal conduit 48. Each of the conduits 48 is associated with valving within the control circuit 23, so that in any one of the actuator means 19a, 19d, and 19e, one of the conduits 48 is pressurized while the opposite conduit 48 is open to exhaust. The shift forks 18a, 18d, and 18e are thus axially positioned against the housings 43 by one of the plungers 42 to effect a positive stop.

The fluid-operated neutralizing actuator means 19b, illustrated in FIG. 2 includes a pair of opposed plungers 49 and 51 having respective outer extremities 52 and 53 disposed in engaging relation with the shift fork 18b for axial movement thereof. The shift fork has a threaded bore 54 in threaded engagement with an externally threaded sleeve 56 provided with a lock nut 57 secured on the sleeve against the fork 18b to define a bearing assembly 58 that assures transverse alignment of the fork and smooth axial travel thereof along a fixed cylindrical shaft 59. Such structure is similar in some respects to that described in U.S. Pat. No. 3,620,097.

The neutralizing actuator means 19b more particularly also includes substantially identical structures oriented in axially opposed relation on opposite sides of the shifting fork 18b. A leftwardly disposed actuator portion 61 is hereinafter referred to as the D actuator since, when energized, it is effective to move the shift fork rightwardly to engage a D coupling shown generally by the reference numeral 62. When the D coupling is engaged, and axially fixed, rotating driven gear 63 is placed in driving relation with an output member 64. A rightwardly disposed actuator portion 65, hereinafter referred to as the C actuator, will move the fork leftwardly when energized to engage a C coupling shown generally by the reference numeral 66. At such time, another axially fixed but rotating driven gear 67 imparts torque to the output member 64 at another gear ratio as shown in the chart set forth above.

With reference to the D actuator, the plunger 49 is disposed in the cylindrical bore 68 of a housing 69 and forms with an internal wall 71 a primary actuating chamber 72. In axially aligned relation with the bore 68 on the opposite side of the wall 71 is another cylindrical bore 73 which includes threads 74 at its outer or leftward extremity. The wall 71 has a cylindrical opening 76 for receiving a cylindrical nose portion 77 of a stepped piston 78 which piston is received in the bore 73 for axial sliding movement and includes a recess 81 that receives a biasing spring 82. An internally recessed end cap 83 is engaged in the threads 74 to close the outer end of the bore 73 and to form with the head portion 79 of the stepped piston a spring chamber 84. The spring 82 is seated within the cap 83 and the head portion 79 to bias the stepped piston rightwardly. With the piston in such a position, a retraction chamber 86 is formed in the bore 73 between the head portion 79 and the wall 71 and an outer or rightward extremity 87 of the nose portion 77 is in contact with the plunger 49 when the shift fork 18b is in the central or neutral condition as shown.

Actuation of the operator shift lever 24 of the circuit 23 causes a plurality of valve members (not shown)

within a console 88 and the shift control circuit 23 to direct fluid from the source from the inlet conduit 31 to a plurality of conduits 90–98 in accordance with the lever position selected. The details of such valve members are set forth in greater detail in U.S. Pat. No. 3,570,636 and 3,667,309, mentioned above. The conduits 90 through 94 are effective to position the shift fork 18b through operation of the actuator means 19b, while the conduits 95 through 98 position the shift fork 18c through operation of the actuator means 19c.

OPERATION

In operation, the placement of the operating lever 24 in the neutral position enables the valving in console 88 to shift the control circuit 23 to first vent the primary actuating chamber 72 of the D actuator and also the corresponding chamber 72' of the C actuator by communicating the conduits 91 and 93 thereto to an exhaust 99, and subsequently to apply system pressure to the spring chambers 84 and 84' of both the D and C actuators via the conduits 90 and 94 respectively to overcome the pressure present in the conduit 92 and the retraction chambers 86 and 86'. Such cancellation of the pressure effects due to introducing pressure on opposite sides of the head portion 79 of the stepped piston 78 allows the mechanical force of the spring 82 and some remaining differential area force to move the stepped piston 78 rightwardly against a stop 101. A similar condition exists in symmetrically opposite relation on the stepped piston 78' of the C actuator to move the piston to a leftward position. The stepped pistons acting through the plungers 49 and 51 force the shift fork 18b to the mid-point of its travel, as shown, thus neutralizing the C-D coupling and disengaging the transmission gear box 12. The actuators move under the combined influence of the springs and the pressure differential caused by the differences in projected pressure areas between the spring chambers 84 and the retraction chamber 86.

In an emergency situation such as might occur if operating pressure (normally about 125 psi) were to drop inadvertently below 60 psi, the inlet conduit 31 would be opened to exhaust as mentioned above by the air charging system 26. Since the chambers 72, 84, and 86 would thus all be vented, the spring 82 would serve to move the stepped piston 78 rightwardly as above, and both actuators would be mechanically moved to center the shifting fork 18b.

Upon the selection of first through fourth and ninth through twelfth speeds by the shift lever 24 as set forth in the above chart, the D coupling 62 is engaged. In such normal working mode, the spring chambers 84 and 84' of both the C and D actuators are vented through exhausting the conduits 90 and 94, and the retraction chambers 86 and 86' are both pressurized through the conduit 92 so that the stepped pistons 78 and 78' are fully retracted away from the plungers 49 and 51 in a condition to compress the springs 82 and 82' and remove their biasing influence. This enables the D actuator to be engaged in a working mode wherein pressure is communicated to the actuating chamber 72 serving to move the plunger 49 and the shift fork 18b rightwardly and overcome the compression load of the spring 82' through the plunger 51 and the stepped piston 78' (it being appreciated that corresponding pressure in the actuating chamber 72' of the C actuator is not present). A shift from fourth to fifth forward speed would cause engagement of the C coupling 66 and disengagement of the D coupling by relieving the pressure in actuating chamber 72 and establishing such pressure in actuating chamber 72'.

To insure that the fluid-operated actuator 19c for selection of the reverse mode of vehicle travel is not engaged at the same time that a forward speed condition exists, the safety actuator portion 41 serves to prevent the selection of reverse by the reverse actuator portion 40 under such a circumstance. The reverse actuator portion is similar to one side of the actuator means shown in FIG. 3, while the portion 41 includes a biasing spring 82", an actuating chamber 72", a retracting chamber 86" and a spring chamber 84" similar to corresponding elements described above. In the event that either of the C or D actuators is energized, the safety system of the present invention directs pressure extant in either the conduits 91 or 93 to the spring chamber 84" via the conduit 95 and further to the safety actuating chamber 72". Thus, if either the C or D actuator means is engaged (not in neutral), the reverse actuator portion 40 cannot overcome the forces in the safety actuator portion 41. If the transmission were in reverse and either the C or D actuator means were energized through a control malfunction, the shift fork 18c and the associated collar 17c would be forced rightwardly and out of engagement by the safety actuator portion 41. For the arrangement shown, the C-D clutch collar 17b must be placed in a neutralized midpoint condition in order to allow a reverse drive gear 103 shown in FIG. 1 to drive an intermediate shaft 104 in a direction opposite the direction in which the engagement of the collar 17b would drive the intermediate shaft.

In view of the foregoing, it should be apparent that the present invention provides an improved control system having desirable safety features. While the invention has been described with particular reference to a preferred embodiment, it is apparent that variations and modifications are possible within the purview of the inventive concepts. No limitations with respect to such variations and modifications is intended, except by the scope of the appended claims.

We claim:

1. A drive transmission for coupling an engine to a driven load at any selected one of a plurality of drive ratios comprising; a plurality of coupling means for coupling selected sets of a plurality of gears, a plurality of shifting fork means for engaging said coupling means and shifting said coupling means for selecting desired gear drive ratios, actuator means associated with said shifting fork means for engaging said fork means and positioning said fork means and said coupling means, fluid pressure supply means, fluid communication means for connecting said supply means with said actuator means for actuation thereof, control means for controlling the flow of pressure fluid to said actuator means, said actuator means including a neutralizing actuator having mechanical means therein for automatically causing one of said shifting fork means to position an associated coupling means to disconnect said engine from said load when said fluid pressure drops below a predetermined value.

2. The invention of claim 1 wherein said neutralizing actuator includes first and second axially aligned housings disposed on axially opposite sides of said one fork means, first and second plungers disposed respectively within said first and second cylindrical bores in said first and second housings, a portion of each of said plungers directly respectively engaging one of said opposite sides of said one fork means for axial movement thereof.

3. The invention of claim 2 wherein said mechanical means of said neutralizing actuator include first and second spring means disposed respectively within said first and second cylindrical bores for normally urging each of said first and second plungers axially toward said one fork means to cause said fork means into a centered position wherein said engine is disconnected from said driven load.

4. The invention of claim 3 wherein said neutralizing actuator further includes first and second stepped pistons mounted respectively within said first and second cylindrical bores axially between said first plunger and first spring means and between said second plunger and second spring means, said spring means directly engaging said stepped pistons and said stepped pistons directly engaging said plungers.

5. The invention of claim 4 wherein said plurality of coupling means include a reverse coupling means for selectively reversing the direction of torque transmission from said engine to said load, said plurality of shifting fork means including a reverse fork means for engaging and selectively shifting said reverse coupling means, said actuator means including a safety actuator associated with said reverse fork means for engaging said fork means and preventing the simultaneous actuation of said reverse coupling means and any of said forward direction coupling means, said safety actuator including mechanical means for automatically normally disconnecting said reverse coupling means.

6. The invention of claim 5 wherein said safety actuator includes third and fourth housings having third and fourth cylindrical bores therein, and third and fourth axially opposed plungers disposed respectively within said bores, said mechanical means of said safety actuator including third spring means for normally causing said third plunger to move said reverse fork means to disconnect said reverse coupling means.

7. The invention of claim 6 wherein said safety actuator includes a third piston disposed within said third cylindrical bore between and directly engaging said third plunger and said third spring means.

8. The invention of claim 1 wherein said control means include first valve means between said supply means and said actuator means, said first valve means having a first position in which said supply means is connected to said actuator means and a second position in which said actuator means are exhausted of pressure fluid, pilot valve means for controlling the activation of said first valve means in accordance with the pressure of fluid in said supply means.

9. The invention of claim 8 wherein said first valve means includes spring means for normally biasing said first valve means into said second position.

10. The invention of claim 9 wherein said pilot valve means allows said first valve means to move to its normal second position whenever said pressure of said supply means drops below said predetermined valve to cause said actuator means to disconnect said engine from said load and to disconnect said reverse coupling means.

* * * * *